3,551,288
PROCESS FOR INCREASING THE WET
STRENGTH OF PAPER
Heinz Ziemann, Leichlingen, Karl-Friedrich Zenner, Cologne-Flittard, Wolfgang Lehmann, Leverkusen, and Gerhard Troemel, Pesch, near Cologne, Germany, assignors to Farbenfabriken Bayer Aktiengesellschaft, Leverkusen, Germany, a corporation of Germany
No Drawing. Filed Jan. 5, 1967, Ser. No. 607,374
Claims priority, application Germany, Feb. 17, 1966, F 48,453
Int. Cl. D21h 3/48; C08g 41/00, 49/00
U.S. Cl. 162—164                                        13 Claims

ABSTRACT OF THE DISCLOSURE

High molecular weight polycondensation and polyaddition products containing nitrogen atoms and having bonded thereto at least two N-alkoxyalkyl urea or thiourea groups and the utility thereof for increasing the wet strength of paper.

---

This invention relates to a process for improving the properties of products obtained from aqueous suspensions of cellulose fibres, wood pulp or synthetic fibres and mixtures thereof. In particular, the invention is concerned with a process for increasing the wet strength of paper, carton, cardboard and other products prepared from aqueous suspensions of the aforementioned raw materials by processes involving shaping. In order to simplify the description of the invention, the end products of these processes are generally referred to below as paper.

It is already known that paper has a characteristic property which makes it unsuitable for many applications, namely the limited resistance of its fibrous structure to the action of water and other liquids. The bonds existing between the paper-forming fibres are loosened or eliminated through swelling so that the mechanical strength of the paper when it is wet is reduced very considerably and the paper itself is converted back into the originally shapeless fibrous pulp.

It has been known for some time that a large number of natural and synthetic substances can improve the wet strength of the paper which has been suitably treated with them. For example, nitrogen-containing formaldehyde resins such as modified cation-active urea-formaldehyde condensation products and melamine-formaldehyde condensation products or highly cation-active polymers such as polyethylene imines and reaction products of polyamines or polyamide amines (basic polyamides) with epichlorhydrin, are used on a large scale as wet strength agents for paper.

In general, the preferred wet strength agents for paper are materials which when added to aqueous pulp suspensions are absorbed by the fibres by virtue of their capacity to fix on the hydrated cellulose, and which in addition are fixed by cross-linking when the finished paper is dried and aged.

Unfortunately, the processes and preparations commonly used to increase the wet strength of paper are attended by various disadvantages which seriously restrict their potential applications on account of the manufacturing and quality requirements which the special properties both of the wet strength agents and of the paper to be manufactured have to satisfy. For example, high condensation temperatures or long ripening times are necessary if the aforementioned formaldehyde resins are used, in order to obtain the highest possible wet strength values for the paper. Another disadvantage is that the formaldehyde vapours released during condensation of the formaldehyde resins contaminate the atmosphere and endanger the health of personnel. In addition, melamine-formaldehyde resins can only be used as wet strength agents providing suitable precondensates have been converted into products with an increased affinity to fibres of relatively high molecular weight by an acid-catalysed further condensation reaction completed immediately before application. Unfortunately, the pot lives of these products are extremely short.

Apart from the desired increase in wet strength, other properties of the wet-strengthened paper are often undesirably influenced. For example, wet-strengthening with urea- or melamine-formaldehyde resins leads to relatively brittle papers whose absorption capacity is for the most part greatly reduced. Highly cation-active wet strength agents, such as, for example, polyethylene imines and the polymers prepared from polyamines or basic polyamides and epichlorhydrin, produce a more or less marked tendency in the paper to yellow, and to some extent eliminate the fluorescence of optically brightened papers.

The present invention relates to a process for increasing the wet strength of paper by means of high-molecular weight polycondensation and/or polyaddition products, which can be dissolved or dispersed in water, and which contain at least two radicals bonded to nitrogen which radicals correspond to the general formula

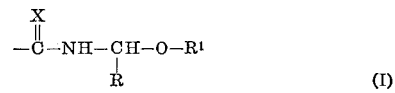
(I)

wherein X represents oxygen or sulphur, R represents a hydrogen atom or a lower alkyl group and $R^1$ represents a saturated or olefinically unsaturated aliphatic radical.

These compounds thus may be represented generally speaking by a general formula

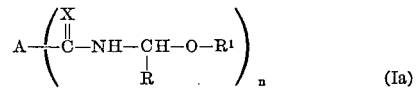
(Ia)

wherein A represents the radical of a high molecular weight polycondensation and/or polyaddition product, X, R and $R^1$ have the meaning already given, n represents a number of at least 2 and up to the number of nitrogen atoms in the polymer radical, and the bond between A and C is effected via a nitrogen atom.

These products can be obtained by a process described in Belgian patent specification No. 675,926 from polymers containing primary and/or secondary amino groups, which are prepared by polycondensation and/or polyaddition, and compounds of the general formula

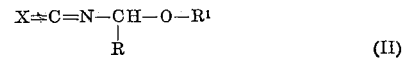
(II)

wherein X, R and $R^1$ are as defined above.

Although it has already been proposed to use bi- or polyfunctional N-alkoxymethylureas for improving the wet strength of paper, the products in question are low-molecular-weight condensation products of urea or substituted ureas, formaldehyde and alcohols which are only able to improve the wet strength of finished paper, for example, by impregnation thereof.

In contrast, polycondensation- and/or polyaddition products with N-alkoxyalkyl urea groups or N-alkoxyalkylthiourea groups and molecular weights in excess of 1000, preferably in excess of 5000, are used in accordance with the invention, the polyaddition products of which preferably contain at least two radicals of Formula I attached to nitrogen for a molecular weight unit of 5000.

It was surprising that these substances are suitable to produce papers with outstanding wet strengths simultaneously show a number of major advantages over conventional wet strength agents not only when introduced into finished paper but also when added to an aqueous pulp suspension.

In the following explanation of the process according to the invention, alkoxyalkyl urea groups and alkoxyalkylisocyanates also include alkoxyalkyl thiourea groups and alkoxyalkylisothiocyanates.

Wet strength agents suitable for use in the process according to the invention include the water-soluble or water dispersible products of the reaction between a polycondensation- and/or polyaddition polymer containing primary and/or secondary amino groups and an alkoxyalkylisocyanate in a proportion of from 0.01 to 1 mol of alkoxyalkylisocyanate for each primary or secondary amino group in the polymer. Such products also include, for example, water-soluble or water-dispersible N-alkoxyalkylisocyanate reaction products of such polycondensation and/or polyaddition products which, in addition to primary and secondary amino groups, also contain tertiary amino groups or functional groups which are unreactive or less reactive to alkoxyalkylisocyanates.

In addition, reaction products, which in addition to alkoxyalkyl urea groups, also contain residual primary and/or secondary amino groups and, in some cases, even tertiary and/or other functional groups which are unreactive or less reactive to alkoxymethylisocyanates can be modified by subsequent substitution and addition reactions, for example, even by quaternisation, and then used in accordance with the invention to increase the wet strength of paper.

Accordingly, suitable starting materials for the production of the cross-linkable high-molecular weight compounds to be used in accordance with the invention, include numerous polycondensation and/or polyaddition products containing primary and/or secondary amino groups, in particular, all kinds of water-soluble linear or branched polymers of the type specified with molecular weights in excess of 1000, and preferably in excess of 5000. The primary or secondary amino groups to be reacted with alkoxyalkylisocyanates can be terminal groups or chain members of the high-molecular-weight starting materials themselves, or, alternatively, terminal groups or members of side-chains.

The following are examples of polycondensation and/or polyaddition products on which the substances to be used in accordance with the invention can be based and the radicals of which constitute A in Formula Ia: Polyamides of tri- or polyvalent amines, in particular polyalkylene polyamines and dicarboxylic acids, or of divalent or polyvalent amines and methylene-bis-acrylamide; polyureas such as reaction products of polyalkylene polyamines with diisocyanates or reaction products of polyalkylene polyamines with urea, dialkyl or diaryl esters of carbonic acid, alkylene-bis-carbamic acid esters or alkylene-bis-ureas; polyamide polyureas of polyalkylene polyamines, in particular, polyethylene polyamines, ε-caprolactam and urea; polyurethanes of polyalkylene polyamines and bis-chloroformic acid esters; polyamines such as reaction products of bi- or poly-valent amines with epichlorhydrin; polyalkylene imines and their partial acylation, cyanethylation or hydroxyethylation products; polyaddition products of di- or polyvalent amines and bis- or higher functional epoxides or glycidyl ethers; polyethers containing secondary amino groups; and hydrogenation products of cyanethylated, high-molecular-weight polyamines and polyether alcohols.

In addition to the tri- or polyvalent amines, certain components of diamines such as, for example, ethylene diamine, hexamethylene diamine or hydroxyethyl ethylene diamine, may also be used in the synthesis of the aforementioned basic polymers.

Alkoxyalkylisocyanates, most suitable for this invention, are those wherein the alkoxy radical contains about 1 to about 6 carbon atoms and the alkyl is a $C_1$ to $C_6$ alkyl. Further the oxygen of the NCO group may be replaced by sulfur.

Examples of alkoxyalkyl isocyanates suitable for the preparation of the high-molecular weight compounds containing N-alkoxyalkylurea groups, which are to be used in accordance with this invention, include N-methoxymethylisocyanate, N-ethoxymethyl isocyanate, isobutoxymethylisocyanate, β-chloroethoxymethyl isocyanate and allylhydroxymethyl isocyanate. N-methoxymethyl isothiocyanate is mentioned as an N-alkoxyalkylisothiocyanate.

Particularly valuable products which can be used in accordance with the invention to increase the wet strength of paper include water-soluble, high-molecular-weight compounds obtainable from the aforementioned starting materials, of which the relatively high molecular weight compounds containing between 5% and 75% by weight of N-alkoxymethylurea radicals and between 0 and 15% by weight of basic nitrogen are preferred.

Typical representatives of this class of compounds are the alkoxymethylisocyanate reaction products of water-soluble basic polyamides synthesised from units of the general formula:

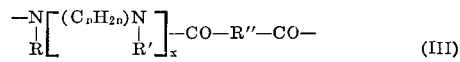

$$-N[(C_nH_{2n})N]_x-CO-R''-CO- \qquad (III)$$
$$\phantom{-N[}R\phantom{(C_nH_{2n})N}R'\phantom{]_x}$$

in which R and R' represent hydrogen, R" represents the divalent radical of a substituted or unsubstituted aliphatic, aromatic or araliphatic dicarboxylic acid, whilst both $n$ and $x$ represent integers of at least 2, or their derivatives in which instead of the symbol R standing for a hydrogen atom and/or instead of there being one or more of the symbols R', there are one or more substituents of the same or of different kind, for example, alkyl-, hydroxy-alkyl-, aminoalkyl-, cyanoalkyl- or carbamidoalkyl radicals e.g., methyl-, ethyl-, β-hydroxyethyl-, β-hydroxypropyl, β-aminoethyl-, aminopropyl-, cyanoethyl- or carbamido-ethyl radicals.

Basic polyamides of this kind required for the production of wet strength agents to be used in accordance with the invention are preferably obtained by polycondensation from polyalkylene polyamines and saturated aliphatic dicarboxylic acids, for example, succinic acid, adipic acid, diglycolic acid, sebacic acid or azelaic acid, Mixtures of two or more dicarboxylic acids may also be used to prepare the basic polyamides.

Suitable polyalkylene polyamines include diethylene triamine, triethylene tetramine, tetraethylene pentamine, pentaethylene hexamine, dipropylene triamine, dipropylene-1,2-triamine, tripropylene-1,2-tetramine, dihexamethylenetriamine and their alkyl, hydroxyalkyl, cyanoalkyl, carboxyalkyl or sulphoxyalkyl derivatives containing at least three primary and/or secondary amino groups, such as their methyl, hydroxyethyl, cyanoethyl, carboxymethyl or sulphoxypropyl derivatives. Apart from mixtures with one another of these polyalkylene polyamines containing at least three primary and/or secondary amino groups, mixtures of the polyalkylene polyamines with diamines, for example, ethylene diamine or N-hydroxyethyl ethylene diamine, or with polyamines containing at least two primary or secondary amino groups in addition to one or more tertiary amino groups, for example, N,N-bis (3-aminopropyl)-methylamine, are also suitable.

To prepare basic polyamines on which the wet strength agents to be used in accordance with the invention can be based, the reactants and the quantities in which they are used are preferably selected in such a way that water-soluble reaction products of the highest possible molecular weight, but not cross-linked, are formed. It is preferred to use the reactants in substantially equimolar quantities so that suitable, basic polyamides are obtained where the molar ratios of dicarboxylic acid to polyamines are between approximately 0.75:1 and approximately 1.25:1. The polycondensation between polyamines and dicarboxylic acids is carried out in the usual way at temperatures in the range from 120° C. to 250° C. and either at normal pressure or at a reduced pressure.

The reaction of polycondensation- and/or polyaddition products containing primary and/or secondary groups with alkoxyalkylisocyanates, preferably methoxymethyl isocyanates, to form the wet strength agents which are to be used in accordance with the invention, is preferably carried out in an alkaline medium at temperatures of from 0° C. to 100° C., preferably from 5° C. to 35° C. This reaction can be carried out in aqueous solution or dispersion because the amino groups react selectively with the alkoxyalkylisocyanates without any appreciable losses of the isocyanate through secondary reactions, for example, with water. The reaction can be regarded as completed when no more isocyanate odour can be detected, which is usually the case after reaction times of 1 to 2 hours or less. On completion of the reaction, the pH-value of the reaction solution is checked and is advantageously adjusted to between pH 6 and 9 for stabilisation, optionally by the addition of an acid or an alkali.

Aqueous solutions prepared in this way from cross-linkable, high molecular weight compounds with a solids content of between 1% and 50%, and preferably between 10% and 25%, are stable upon storage in the average pH range of from about 6 to 9, and may be directly used as such, without further pre-treatment, as wet strength agents for paper. The best wet-strengthening effect of the products in accordance with the invention is obtained when the viscosity of a 10% solution thereof amounts to at least 5 cp., the viscosity of a 15% solution to at least 10 cp. and the viscosity of a 20% solution to at least 20 cp. at a temperature of 25° C.

In some cases, the effectiveness of the wet strength agents to be used in accordance with the invention, particularly when they are intended to be added to an aqueous paper pulp suspension, can be improved by an increase in molecular weight. For this purpose, the polymeric starting materials containing primary and/or secondary amino groups or their alkoxyalkyl isocyanate reaction products can be converted, preferably in aqueous solution, into relatively high molecular weight products with the requisite viscosity with the aid of suitable bi- or high functional compounds, as chain extenders. Suitable chain extenders include, for example, chloroacetyl chloride, methylene-bis-acrylamide, epichlorhydrin, bi- or higher functional glycidyl ethers, water-soluble bis-chloroformic acid esters, alkylene-bis-maleic imides, β-chloroethyl chloroformic acid esters or phosgene.

The high molecular weight polycondensation and/or polyaddition products containing N-alkoxyalkylurea groups to be used in accordance with the invention provide the paper with improved wet strength when used in any suitable manner in quantities of between approximately 0.01% and 2% or more, based on the dry weight of the paper. They can be applied to the fibrous material of the finished paper in the form of solutions or dispersions or, according to a preferred alternative, can be added to an aqueous pulp suspension before sheet formation. The quantities required in each individual case can be readily determined by preliminary tests. When the treated paper is dried at temperatures in the range of from 80° C. to 100° C. condensation of the polymers added is completed within a matter of minutes, accompanied by cross-linking and the formation of insoluble resins fixed to the cellulose.

The manufacture of the paper with improved wet strenght using polycondensation or polyaddition products containing N-alkoxyalkylurea groups can be carried out under acid, neutral or alkaline conditions, although particularly high wet strengths are usually obtained in the acid range, preferably at pH values of between 4.0 and 6.5.

The superiority of the process according to the invention is mainly attributable to the fact that the high molecular weight compounds containing N-alkoxyalkylurea groups which are used as the wet strengtheners are able to increase both the wet and dry strength of the paper to a greater extent than the conventional wet strength agents referred to earlier on.

Further advantages of the process according to the invention are that no formaldehyde is liberated during the further condensation of the high molecular weight substances containing N-alkoxyalkyl urea groups which are employed as ready-to-use and storable single-component systems, and that, after a brief period of heating at relatively low temperatures or immediately on leaving the paper-making machine, the wet strength of the papers is higher than it would be if conventional strength agents had been used, so that the period for which the finished paper must be stored in any case for so-called "post-ripening" can be shortened accordingly.

It is particularly desirable for many applications of wet-strengthened papers, cellulose "wadding" in particular, to maintain absorbency which shows little or no deterioration when the high molecular weight compounds containing N-alkoxyalkylurea groups are used in accordance with the invention.

Further properties of the wet strength agents to be used in accordance with the invention which have proved to be of particular advantage are the fact that they have hardly any effect on fluorescence when combined with fluorescent dyes, and finally that they show a more or less high retention on fine fibres, fillers and pigments.

The process according to the invention is illustrated by the following examples.

EXAMPLE 1

Separate 1 kg. batches of a conventionally prepared 0.25% suspension of bleached sulphite pulp with a degree of fineness of approximately 35° SR (Schopper-Riegler), are each mixed with 0.1 g. of one of the 10% aqueous solutions of polyamides containing N-ethoxymethylurea groups, whose preparation is described in the following in paragraphs (a) to (e). The pulp suspension is then diluted with 6 litres of water and converted into paper at a pH-value of 4.5 in a Rapid-Köthen sheet former. The paper is then heated for 5 minutes to 110° C. to increase its dry strength and wet strength to the ultimate value corresponding to the effectiveness of the auxiliary and the quantity in which it is added.

The 10% aqueous solutions used for this examples were prepared as follows:

(a) 100 g. of water followed by 292 g. of adipic acid (2 mols) were added to 185 g. of (1.8 mols) of diethylenetriamine in a reaction vessel equipped with a stirring mechanism, a gas inlet pipe, a thermometer and a reflux condenser. The temperature of the mixture was then raised to 185° C. over a period of 2½ hours, during which nitrogen was passed over, in such a way that water was uniformly distilled off. After continued stirring at 185° C. to 190° C., an extremely viscous condensation product was formed within one hour, being absorbed in the same quantity by weight of water. 800 g. of a 50% solution of the basic polyamide with a viscosity of 29 poises at 25° C. and an equivalent weight of 460 were obtained.

460 g. (1 val.) of this polyamide solution were diluted with 460 g. of water, 58 g. (0.66 mol) of methoxymethyl isocyanate being added at 20° C.–25° C. over a period of 20 minutes. The reaction solution was then stirred for another two hours at 25° C.–30° C., diluted with 1.89 kg. of water and adjusted with glacial acetic acid to pH 7.5. The resulting 10% solution of the reaction product had a viscosity of 8 cp. at 25° C.

(b) 292 g. of adipic acid were added to a mixture of 194 g. (1.88 mols) of diethylene-triamine, 21.6 g. (0.36 mol) of ethylene diamine and 100 g. of water, in a reaction vessel equipped with a stirring mechanism, a gas inlet pipe and a reflux condenser. The mixture was then slowly heated with stirring to 180° C. while nitrogen was passed over it, the temperature being raised in such a way that water was uniformly distilled off. The temperature of the melt was then kept for some three hours at 180° C.–

190° C. The melt was then further condensed for one hour at 180° C. under reduced pressure (20–50 mm. Hg). The cooled melt was absorbed in the same quantity by weight of water. 850 g. of a 50% aqueous solution of the basic polyamide with a viscosity of 500 cp. at 25° C. and an equivalent weight of 380 were obtained.

760 g. (2 vals.) of this polyamide solution were diluted with 400 g. of water, 40 g. (0.2 mol) of butane-1,4-bis-glycidyl ether being added dropwise at 15° C. The solution was then heated to 55° C. and kept at this temperature until its viscosity had risen to 150 cp. at 55° C. It was then diluted with 900 g. of water and stirred for another three hours at 55° C. The 20% solution then had a viscosity of approximately 130 cp. at 55° C.

11 g. (0.25 mol) of methoxymethyl isocyanate were added dropwise with stirring to 525 g. (0.5 val.) of this 20% polyamide solution over a period of 20 minutes at 15° C.–20° C. After 1 hour's stirring at 20° C.–30° C., 614 g. of water and 10 g. of acetic acid were added. The 10% solution thus obtained, with a pH value of 7.5, had a viscosity of 17 cp. at 25° C.

(c) 22 g. (0.25 mol) of methoxymethyl isocyanate were added dropwise with stirring to 525 g. (0.5 val.) of the 20% polyamide solution prepared in accordance with the details set out in (b) over a period of 30 minutes at 15° C.–20° C. After 1 hour's stirring at 20° C.–30° C., 718 g. of water and 5 g. of acetic acid were added. The 10% solution of the reaction product thus obtained had a pH value of 7 and a viscosity of 13 cp. at 25° C.

(d) 33 g. (0.38 mol) of methoxymethylisocyanate were added dropwise with stirring to 525 g. (0.5 val.) of the 20% polyamide solution prepared in accordance with the details set out in (b) over a period of 14 minutes at 15° C.–20° C. After 1 hour's stirring at 20° C.–30° C., 820 g. of water and 2 g. of acetic acid were added. The 10% solution of the reaction product thus obtained had a pH value of 7 and a viscosity of 11 cp. at 25° C.

(e) 43.5 g. (0.5 mol) of methoxymethyl isocyanate were added dropwise with stirring to 525 g. (0.5 val.) of the 20% polyamide solution prepared in accordance with the details set out in (b) over a period of 50 minutes at 15° C.–20° C. After 1 hour's stirring at 20° C.–30° C., 916 g. of water were added. The 10% solution of the reaction product thus obtained had a pH value of 7.5 and a viscosity of 9 cp. at 25° C.

A survey of the effects of the 10% solutions of methoxymethyl isocyanate reaction products, as described in paragraphs (a) to (e) of this example, on the increase in both the dry strength and the wet strength of the paper treated with them, is given in the following Table I in with the absorption levels in mm. indicated as a measure of the absorbency of the paper.

groups whose preparation is described in paragraphs (a) to (g). Following dilution with 6 litres of water, the pulp suspensions are converted into paper in a Rapid-Köthen sheet former at pH values in the range of from approximately 4.5 to approximately 6.5 The paper is then heated for 5 minutes to 110° C. to increase its dry and wet strengths to the ultimate value corresponding to the effectiveness of the wet strength agent and the quantity in which it is added.

The 10% solutions used for this example were prepared as follows:

(a) 319 g. (2.18 mols) of triethylene tetramine and 292 g. (2 mols) of adipic acid were reacted in accordance with the details set out in Example 1(b). The resulting 50% polyamide solution had a viscosity of 12 poises and an equivalent weight of 220.

300 g. of a 2% aqueous solution of methylene-bis-acrylamide were added dropwise with stirring to 440 g. (2 vals.) of this polyamide solution over a period of 1 hour at 60° C.–65° C. The now approximately 30% solution with a viscosity of about 120 cp. at 60° C. was then diluted with 300 g. of water. Following the addition of another 100 g. of 2% aqueous methylene-bis-acrylamide solution over a period of some three hours at 60°–65° C., the viscosity of the now 20% solution rose again to approximately 120 cp. at 60° C.

570 g. (1 val.) of this solution were diluted with 250 g. of water, 22 g. (0.25 mol) of methoxymethyl isocyanate being added with stirring over a period of 30 minutes at 10° C.–15° C. After 1 hour's stirring at 15° C.–30° C. 500 g. of water and 10 g. of glacial acetic acid were added. The resulting 10% solution of the reaction product had a pH value of 8 and a viscosity of 60 cp. at 25° C.

(b) 570 g. (1 val.) of the 20% polyamide solution prepared in accordance with the details set out in paragraph (a) were diluted 500 g. of water, 65 g. (0.75 mol) of methoxymethyl isocyanate being added with stirring over a period of 40 minutes at 10° C.–20° C. After 1 hour's stirring at 20° C.–30° C., 660 g. of water and 5 g. of glacial acetic acid were added. The resulting 10% solution of the reaction product had a viscosity of 38 cp. at 25° C. and a pH value of 7.5.

(c) 416 g. (2.25 mols) of tetraethylene pentamine and 292 g. (2 mols) of adipic acid were reacted in accordance with the details set out in Example 1(b). The resulting 50% solution of the basic polyamide had a viscosity of 22 poises at 25° C. and an equivalent weight of 200.

200 g. of a 3% aqueous solution of methylene-bis-acrylamide were added with stirring to 400 g. of this polyamide solution (2 vals.) over a period of 30 minutes at 60°–65° C. The resulting 35% solution with a viscosity of approximately 160 cp. at 65° C. was diluted with 340

TABLE I

| Wet strength agent | Quantity added in percent solid substance, based on dry weight of the paper | Weight per unit area of the paper in g./m.² | Breaking length in m. Dry | Breaking length in m. Wet | Relative wet strength in percent | Absorption level in mm. |
|---|---|---|---|---|---|---|
| None | | 80 | 4,250 | 140 | 3.3 | 25 |
| Solution (a) | 0.4 | 80 | 4,550 | 1,050 | 23.0 | 20 |
| Solution (b) | 0.4 | 80 | 4,800 | 1,000 | 21.0 | 21 |
| Solution (c) | 0.4 | 80 | 5,100 | 1,400 | 27.5 | 21 |
| Solution (d) | 0.4 | 80 | 1,150 | 1,400 | 27.2 | 20 |
| Solution (e) | 0.4 | 80 | 4,900 | 1,350 | 27.6 | 21 |
| Commercial comparison sample (I) | 0.4 | 80 | 4,350 | 1,000 | 23.0 | 20 |
| Commercial comparison sample (II) | 0.4 | 80 | 4,200 | 800 | 19 | 17 |

NOTE:
I = Epichlorhydrin reaction product of a basic polyamide of diethylene triamine and adipic acid.
II = Urea formaldehyde resin.

EXAMPLE 2

Separate 1 kg. batches of a conventionally prepared 0.25% suspension of bleached sulphite pulp with a degree of fineness of approximately 35° SR (Schopper-Riegler) are each mixed with 0.1 g. of one of the 10% aqueous solutions of polyamides containing N-methoxymethylurea g. of water. Following the addition of another 100 g. of 3% methylene-bis-acrylamide solution over a period of 5 hours at 65° C., the viscosity of the 20% solution amounted to approximately 100 cp. at 65° C.

260 g. (0.5 vals.) of this solution were mixed with 11 g. (0.125 mol) of methoxymethyl isocyanate over a period of 20 minutes at 5° C.–10° C. After 1 hour's stirring at 10° C.–25° C. the solution was diluted with 350 g. of water and its pH value was adjusted to 178 with acetic acid. The resulting 10% solution had a viscosity of 34 cp. at 25° C.

(d) 22 g. (0.25 mol) of methoxymethyl isocyanate were added dropwise to 260 g. (0.5 val.) of the 20% polyamide solution prepared in accordance with the details set out in paragraph (c), over a period of 30 minutes at 5° C.–15° C. After 1 hour's stirring at 15° C.–30° C., the solution was diluted with 450 g. of water and its pH value adjusted to 7.5 with 8 g. of glacial acetic acid. The resulting 10% solution had a viscosity of 28 cp. at 25° C.

(e) 36 g. (0.25 mol) of methoxymethyl isothiocyanate were added dropwise with stirring to 260 g. (0.5 val.) of the 20% polyamide solution prepared in accordance with the details set out in paragraph (c) over a period of 30 minutes at 10° C.–15° C. After 1 hour's stirring at 15° C.–20° C., 575 g. of water and 8 g. of acetic acid were added with stirring to 550 g. (0.5 val.) of the 20% polyamide solution prepared in accordance with the details set out in paragraph.

(e) over a period of 20 minutes at 15° C. The solution was then saturated with carbon dioxide and diluted with 500 g. of water. After it had been heated to 60° C. 11 g. (0.25 mol) of ethylene oxide were added. A 10% solution with a viscosity of 10 cp. at 25° C. and a pH value of 7 was prepared by the addition of 340 g. of water and 3 g. of acetic acid.

The increases in both the dry and wet strengths obtained with the 10% solutions, described in paragraphs (a) to (g) of methoxymethyl isocyanate reaction products at pH 4.5 and the associated absorption levels in mm. serving as an indication of the absorbency of the paper, are shown in the following Table II. Table III contain similar data for papers which were prepared with the corresponding additives at pH 6.5.

TABLE II

| Wet strength agent | Quantity added in percent solid substance, based on dry weight of the paper | Weight per unit area of the paper in g./m.² | Breaking length in m. | | Relative wet strength in percent | Absorption level in mm. |
| --- | --- | --- | --- | --- | --- | --- |
| | | | Dry | Wet | | |
| None | | 80 | 4,250 | 140 | 3.3 | 25 |
| Solution (a) | 0.4 | 80 | 4,500 | 1,050 | 23.4 | 22 |
| Solution (b) | 0.4 | 80 | 4,650 | 1,300 | 28 | 21 |
| Solution (c) | 0.4 | 80 | 4,850 | 1,100 | 22.7 | 24 |
| Solution (d) | 0.4 | 80 | 5,000 | 1,400 | 28 | 24 |
| Solution (e) | 0.4 | 80 | 4,900 | 1,380 | 28 | 20 |
| Solution (f) | 0.4 | 80 | 4,650 | 1,250 | 26.9 | 20 |
| Solution (g) | 0.4 | 80 | 4,000 | 090 | 22.5 | 20 |
| Commercial (comparison sample (I)) | 0.4 | 80 | 4,500 | 1,000 | 22.2 | 17 |
| Commercial comparison sample (II) | 0.4 | 80 | 4,300 | 800 | 18.5 | 17 |

NOTE:
I=Epichlorhydrin reaction product of a basic polyamide of diethylene triamine and adipic acid.
II=Urea formaldehyde resin.

TABLE III

| Wet strength agent | Quantity added in percent solid substance, based on dry weight of the paper | Weight per unit area of the paper in g./m.² | Breaking length in m. | | Relative wet strength in percent | Absorption level in mm. |
| --- | --- | --- | --- | --- | --- | --- |
| | | | Dry | Wet | | |
| None | | 80 | 4,250 | 140 | 3.3 | 25 |
| Solution (a) | 0.4 | 80 | 4,500 | 800 | 17.8 | 21 |
| Solution (b) | 0.4 | 80 | 4,300 | 900 | 21.0 | 20 |
| Solution (c) | 0.4 | 80 | 4,750 | 850 | 18.0 | 23 |
| Solution (d) | 0.4 | 80 | 4,600 | 950 | 20.6 | 23 |
| Solution (e) | 0.4 | 80 | 4,700 | 1,000 | 21.2 | 21 |
| Solution (f) | 0.4 | 80 | 4,100 | 870 | 21.2 | 20 |
| Solution (g) | 0.4 | 80 | 4,050 | 600 | 14.8 | 22 |
| Polyamide-epichlorhydrin resin | 0.4 | 80 | 4,500 | 1,000 | 22.2 | 19 | were added. The 10% solution of the reaction product thus obtained had a viscosity of 20 cp. at 25° C.

(f) A polyamide was prepared in accordance with the details set out in Example 1(b) from 145 g. (1 mol) of N,N-bis-(3-amino-propyl)-methylamine, 103 g. (1 mol) of diethylene triamine and 292 g. (2 mols) of adipic acid. A 50% aqueous solution of the polyamide had a viscosity of 26 poises at 25° C. and an equivalent weight of 430.

150 g. of a 4% aqueous solution of methylene-bis-acrylamide heated to 50° C. were added with stirring to 430 g. (1 val.) of this polyamide solution over a period of 10 minutes at 55° C.–60° C. The now 38% solution whose viscosity had rapidly risen to 200 cp. at 60° C. was diluted with 520 g. of water. Stirring was then continued for another 4 hours at 55° C. The viscosity of the 20% solution was then about 100 cp. at 55° C.

22 g. (0.25 mol) of methoxymethyl isocyanate were added dropwise with stirring to 550 g. (0.5 val.) of this 20% polyamide solution over a period of 20 minutes at 15° C. The solution was then diluted with 740 g. of water and stirred for one hour at 15° C.–40° C. Following the addition of 7 g. of acetic acid, the 10% solution of the reaction product had a pH value of 8 and a viscosity of 20 cp. at 25° C.

(g) 22 g. (0.25 mol) of methoxymethyl isocyanate

EXAMPLE 3

Separate 1 kg. batches of a conventionally prepared 0.25% suspension of bleached sulphite pulp with a degree of fineness of approximately 35° SR (Schopper-Riegler) are each mixed with 0.1 g. of one or the 10% solutions of methoxymethyl isocyanate reaction products whose preparation is described in paragraphs (a) to (c). Following dilution with 6 litres of water, the paper pulp suspension is converted into paper in a Rapid-Köthen sheet formed at a pH value of approximately 4.5 The paper is then heated for 5 minutes to 110° C. to increase both the dry strength and wet strength of the paper to the ultimate value corresponding to the effectiveness of the wet strength agent and the quantity in which it is added.

The 10% solutions used in this example were prepared as follows:

(a) 43.5 g. (0.5 mol) of methoxymethyl isocyanate were added dropwise with stirring to 400 g. of an 11% solution of polyethyleneimine over a period of 30 minutes at 15° C.–20° C. After 2 hour's stirring at 20° C.–30° C., 415 g. of water and 17 g. of acetic acid were added. The resulting 10% solution of the reaction product had a pH value of 8 and a viscosity of 10 cp. at 25° C.

(b) 87 g. (1 mol) of methoxymethyl isocyanate were added dropwise with stirring to 550 g. of an 8% aqueous solution of polyethylene imine, over a period of 2 hours at 25° C.–35° C. After two hours at 35° C.–25° C., 673 g. of water were added. The resulting 10% solution of the reaction product had a viscosity of 5 cp. at 25° C.

(c) 43 g. of methoxymethyl isocyanate were added with stirring over a period of 30 minutes at 15° C.–25° C. to 1 kg. of a 10% aqueous solution of a high molecular weight polycondensation product of epichlorhydrin and bis-(3-aminopropyl)-methylamine in a molar ratio of about 0.9:1. After two hours stirring at 25° C., 360 g. of water and 27 g. of glacial acetic acid were added. The 10% solution of the reaction product thus obtained had a pH value of 8 and a viscosity of 14 cp. at 25° C.

(d) 103 g. of a 15% aqueous solution of a high molecular weight polycondensation product of epichlorhydrin and ethylene diamine in a molar ratio of 1.58:1 were mixed with 61 g. of saturated soda solution and 34 g. of water. 8.7 g. of methoxymethyl isocyanate were then added dropwise with stirring over a period of 10 minutes at 10° C.–15° C. After 1 hour's stirring at 15° C.–25° C. the solution was diluted with 36 g. of water. The resulting 10% solution of the reaction product had a pH value of 7 and a viscosity of 8 cp. at 25° C.

(e) A mixture of 113 g. (1.1 mols) of diethylene triamine and 226 g. of ε-caprolactam were heated to 25° C. over a period of four hours, during which nitrogen was passed over, in a reaction vessel equipped with a stirring mechanism, a gas inlet pipe and a reflux condenser. The mixture was kept at this temperature until about 10 g. of distillate had passed over. The product was then cooled to 160° C. and a vacuum was applied. After approximately 15 g. of vacuum distillate had been separated, the product was cooled to 80° C., while the vacuum was equalised with nitrogen. Following the addition of 48 g. (0.8 mol) of urea, the temperature was again slowly increased to 165° C. and kept there until the evolution of ammonia had visibly subsided. Condensation was continued for about 1 hour at reduced pressure. After cooling to 125° C., the polyamidepolyurea formed was dissolved in the same quantity by weight of water. The 50% aqueous solution had an equivalent weight of 500.

7.4 g. (0.08 mol) of epichlorhydrin were added dropwise with stirring to 100 g. (0.2 val.) of this 50% polyamide polyurea over a period of 10 minutes at 30° C.–40° C. The temperature of this solution was then increased to and kept at 60° C.–65° C. The solution whose viscosity had risen within an hour to approximately 120 cp. at 65° C. was then diluted in stages with a total of 180 g. of water added in quantities of 30, 50 and 100 g. after the viscosity had risen to 100–120 cp. at 60° C.–65° C. A 20% solution with a viscosity of approximately 120 cp. at 65° C. was obtained. Following further dilution of this solution with 155 g. of water and the addition of 20 g. of a concentrated soda solution, 8.7 g. (0.1 mol) of methoxymethyl isocyanate were added dropwise at 20° C.–25° C. over a period of 15 minutes. Following 1 hour's stirring at 25° C. a 10% solution of the reaction product which had a viscosity of 10 cp. at 25° C. was obtained by the addition of 200 g. of water.

The increases in both the dry strength and wet strength obtained with the 10% solution of methoxymethyl isocyanate reaction products (described in paragraphs (a) to (e)), and the associated absorption levels serving as an indication of the absorbency of the paper, are set out in Table IV.

TABLE IV

| Wet strength agent | Quantity added in percent solid substance, based on dry weight of the paper | Weight per unit area of the paper in g./m.$^2$ | Breaking length in m. Dry | Breaking length in m. Wet | Relative wet strength in percent | Absorption level in mm |
|---|---|---|---|---|---|---|
| None | | 80 | 4,450 | 120 | 2.7 | 22 |
| Solution (a) | 0.4 | 80 | 5,250 | 1,400 | 26.7 | 22 |
| Solution (b) | 0.4 | 80 | 5,250 | 1,550 | 29.6 | 18 |
| Solution (c) | 0.4 | 80 | 5,150 | 1,350 | 26.2 | 24 |
| Solution (d) | 0.4 | 80 | 4,500 | 1,100 | 24.4 | 22 |
| Solution (e) | 0.4 | 80 | 4,850 | 1,200 | 24.8 | 21 |
| Commercial comparison sample (I) | 0.4 | 80 | 4,750 | 1,100 | 23.2 | 20 |
| Commercial comparison sample (II) | 0.4 | 80 | 4,550 | 870 | 19 | 17 |

NOTE:
I = Epichlorhydrin reaction product of a basic polyamide of diethylene triamine and adipic acid.
II = Urea formaldehyde resin.

EXAMPLE 4

(a) Separate 1 kg. batches of a conventionally prepared 0.25% aqueous suspension of bleached sulphite pulp with a degree of fineness of approximately 35° SR were mixed with 0.025 g.; 0.05 g.; 0.075 g. and 0.1 g. respectively, of the 10% aqueous solutions of the polyamide containing methoxymethyl urea groups whose preparation was described in Example 1, paragraph (c). The suspension was then diluted with 6 litres of water and converted into paper at a pH value of 4.5 in a Rapid-Köthen sheet former. The pre-dried paper was heated for 5 minutes to 110° C. to increase its wet and dry strengths to the ultimate values corresponding to the quantities of wet strength agent added. The results are set out in Table V.

TABLE V

| Quantity added in percent (based on dry weight) | Breaking length in m. Dry | Breaking length in m. Wet | Relative strength in percent | Absorption level in mm. |
|---|---|---|---|---|
| 0.1 | 5,400 | 850 | 15.7 | 20 |
| 0.2 | 5,450 | 1,100 | 20.2 | 19 |
| 0.3 | 5,500 | 1,250 | 23.2 | 19 |
| 0.4 | 5,550 | 1,400 | 25.2 | 20 |

NOTE: The weight per unit area of each sheet was 80±1 g. per m.$^2$.
$$\frac{\text{Breaking length wet}}{\text{Breaking length dry}} \cdot 100 = \text{relative wet strength in percent.}$$

(b) In order to demonstrate the more rapid complete condensation of the substances used in accordance with the invention as compared with polyamide-epichlorhydrin resins, the wet strengths obtained with the methoxymethyl isocyanate reaction product whose preparation is described in Example 1, paragraph (c), and those obtained with a polyamide-epichlorhydrin resin, are compared in Table VI in dependence upon the condensation time. The sheets prepared with 4% of the 10% wet strength agent solutions, based on the dry weight of the paper, were initially dried for 4 minutes at 80° C. and then post-condensed for different periods at 110° C. in a drying cabinet.

TABLE VI

| Condensation time in secs.: | Wet strength in percent of end value Using Solution (c) of Example 1 | Wet strength in percent of end value Using polyamide-epichlorhydrin |
|---|---|---|
| After drying | 66 | 52 |
| 30 | 75 | 68 |
| 60 | 80 | 68 |
| 120 | 98 | 82 |
| 300 | 100 | 95 |

We claim:
1. A method for increasing the wet strength of paper which comprises the steps of (1) admixing with paper pulp a wet strength increasing amount of an aqueous solution or suspension of a crosslinkable polycondensation and/or polyaddition product having a molecular weight in excess of 1000, said product being selected from the group consisting of polyamides, polyamide polyureas, polyamines, polyalkylene imines, polyaddition products of a polyamide and a polyepoxide or a glycidyl ether and having bonded thereto via nitrogen at least two radicals of the formula

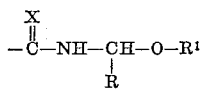

wherein X is oxygen or sulfur, R is hydrogen or alkyl containing from 1 to 6 carbon atoms and $R^1$ is alkyl containing from about 1 to about 6 carbon atoms, (2) forming paper from said pulp admixed with said product and (3) drying said paper at elevated temperature thereby effecting crosslinking of said product.

2. Method according to claim 1 wherein said crosslinkable high molecular weight product is a high molecular weight polycondensation and/or polyaddition product having a molecular weight in excess of 5000 and containing at least two radicals of said formula for each moleular weight unit of 5000.

3. Method according to claim 1 wherein said crosslinkable high molecular weight product contains basic nitrogen atoms.

4. Method according to claim 1 wherein said cross-linkable high molecular weight product is a polyamide.

5. Method according to claim 1 wherein said crosslinkable high molecular weight product is a polyamine.

6. Method according to claim 1 wherein said crosslinkable high molecular weight product is the addition product of a polyamine and a polyepoxide.

7. Method according to claim 1 wherein said crosslinkable high molecular weight product is the reaction product of polycondensation and/or polyaddition products containing primary or secondary amino groups with stoichiometrically insufficient amounts of N-alkoxyalkyl isocyanates and/or N-alkoxyalkyl isothiocyanates.

8. Method according to claim 1 wherein said crosslinkable high molecular weight product is a polycondensation and/or polyaddition product containing bonded to nitrogen atoms at least 5% by weight of the radical of the formula

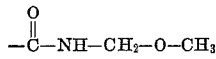

9. Method according to claim 1 wherein said crosslinkable high molecular weight product is a reaction product of a polycondensation and/or polyaddition product containing primary and/or secondary amino groups and methoxymethyl isocyanate.

10. Method according to claim 1 wherein said crosslinkable high molecular weight product is produced by reacting a water-soluble basic polymide from a polycondensation of a dicarboxylic acid and a polyamine containing at least three primary or secondary amino groups or mixtures of these polyamines with diamines and molar ratios of from 0.75 to 1:1.25 to 1 with an alkoxyalkyl isocyanate or an alkoxyalkyl isothiocyanate.

11. Paper having incorporated therein a wet strength increasing amount of a crosslinked polycondensation and/or polyaddition product, said product, prior to crosslinking, having a molecular weight of at least 1000 and being selected from the group consisting of polyamides, polyamide polyureas, polyamines, polyalkylene imines, polyaddition products of a polyamide and a polyepoxide or a glycidyl ether and having bonded thereto via nitrogen at least two radicals of the formula

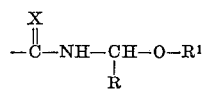

wherein X is oxygen or sulfur, R is hydrogen or alkyl containing from 1 to 6 carbon atoms and $R^1$ is alkyl containing from about 1 to about 6 carbon atoms.

12. Paper according to claim 11 wherein said polycondensation and/or polyaddition product contains at least two groups of said formula per each molecular weight unit of 5000.

13. Paper according to claim 11 wherein said high molecular weight polycondensation and/or polyaddition product is selected from the group consisting of polyamides and polyamines.

References Cited

UNITED STATES PATENTS 2,734,890  2/1956  Bortnick et al. _____ 162—168X
3,170,901  2/1965  Melamed et al. ____ 162—168X

FOREIGN PATENTS 675,926  2/1966  Belgium.

OTHER REFERENCES

Harper, R. J., et al., "A Reactive Polyamide to Improve Wet Wrinkle Recovery and Abrasion Resistance of Wash-Wear Cottons," American Dyestuff Reporter, vol. 55, No. 10, pp. 41–43, May 1966.

S. LEON BASHORE, Primary Examiner

F. FREI, Assistant Examiner

U.S. Cl. X.R.

162—168; 260—29.2, 75, 77.5, 453, 849